(12) United States Patent
Duguay et al.

(10) Patent No.: US 9,784,125 B2
(45) Date of Patent: Oct. 10, 2017

(54) BLADE OUTER AIR SEALS WITH CHANNELS

(71) Applicant: UNITED TECHNOLOGIES CORPORATION, Farmington, CT (US)

(72) Inventors: Brian Duguay, Berwick, ME (US); Dmitriy A. Romanov, Wells, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 212 days.

(21) Appl. No.: 14/704,752

(22) Filed: May 5, 2015

(65) Prior Publication Data

US 2016/0326907 A1    Nov. 10, 2016

(51) Int. Cl.
 *F01D 11/08* (2006.01)
 *F01D 25/12* (2006.01)
 *F01D 5/18* (2006.01)

(52) U.S. Cl.
 CPC ............. *F01D 25/12* (2013.01); *F01D 5/187* (2013.01); *F01D 11/08* (2013.01); *F05D 2220/32* (2013.01); *F05D 2230/10* (2013.01); *F05D 2240/11* (2013.01); *F05D 2260/20* (2013.01); *Y02T 50/676* (2013.01)

(58) Field of Classification Search
 CPC ........... F01D 11/08; F01D 25/12; F01D 5/187
 USPC ...................................................... 415/173.1
 See application file for complete search history.

(56) References Cited

U.S. PATENT DOCUMENTS

| 7,670,108 B2 * | 3/2010 | Liang .................... F01D 11/008 415/173.1 |
| 8,596,963 B1 | 12/2013 | Liang |
| 2007/0248462 A1 | 10/2007 | Lutjen et al. |
| 2010/0226762 A1 * | 9/2010 | Lutjen .................... F01D 11/08 415/178 |
| 2011/0044805 A1 | 2/2011 | Koyabu et al. |
| 2014/0286751 A1 | 9/2014 | Brunelli et al. |

FOREIGN PATENT DOCUMENTS

WO          03006883          1/2003

OTHER PUBLICATIONS

European Search Report, European Application No. 16158754.8, Date of Mailing Oct. 11, 2016, European Patent office; European Search Report 8 pages.

* cited by examiner

Primary Examiner — Richard Edgar
(74) Attorney, Agent, or Firm — Cantor Colburn LLP

(57) ABSTRACT

A blade outer air seal (BOAS) includes a body defining a core having a forward cavity portion and a plurality of forward hooks extending radially from the body, the hooks extending to a hook height. The BOAS includes a seal surface defined between the forward hooks and which includes a forward side, an aft side, and a seal surface height. The seal surface is aft of the forward cavity portion. The BOAS includes a thermal regulation channel defining an inlet aft of the sealing surface and an outlet defined in fluid communication with the forward cavity portion.

14 Claims, 2 Drawing Sheets

BLADE OUTER AIR SEALS WITH CHANNELS

STATEMENT OF GOVERNMENT RIGHTS

This invention was made with government support under contract no. FA8650-09-D-2923 0021 awarded by the Air Force. The government has certain rights in the invention.

BACKGROUND

1. Field

The present disclosure relates to blade outer air seals, more specifically to thermal regulation channels defined in blade outer air seals.

2. Description of Related Art

Traditional blade outer air seals (BOAS) include radial inlet holes near a leading edge portion thereof to allow cooling flow to be fed to a core of the BOAS for cooling. However, certain BOAS are positioned in the turbomachine in communication with a double-axial brush seal that prevents feeding the core of the BOAS with radial inlet holes because the traditional radial inlet holes are blocked by the brush seal. Traditional ceramic core designs have used over-pass features to supply cooling air to the forward most core portions, however, such solutions may not be feasible with certain core designs.

Such conventional methods and systems have generally been considered satisfactory for their intended purpose. However, there is still a need in the art for improved BOAS cooling assemblies. The present disclosure provides a solution for this need.

SUMMARY

In accordance with at least one aspect of this disclosure, a blade outer air seal (BOAS) includes a body defining a core having a forward cavity portion and a plurality of forward hooks extending radially from the body, the hooks extending to a hook height. The BOAS includes a seal surface defined between the forward hooks and which includes a forward side, an aft side, and a seal surface height. The seal surface is aft of the forward cavity portion. The BOAS includes a thermal regulation channel defining an inlet aft of the sealing surface and an outlet defined in fluid communication with the forward cavity portion.

The thermal regulation channel can be defined at an angle from the inlet to the outlet relative to a radial direction. The inlet can be defined in the aft side of the seal surface. The outlet can be defined at least partially forward of the forward side of the seal surface.

The BOAS can further include a plurality of side outlets in fluid communication with the forward cavity portion to allow flow to effuse from a side of the BOAS and into a gas path. The BOAS can include one or more flow guides and/or posts disposed between the outlet of the thermal regulation channel and the side outlets.

In certain embodiments, the inlet can be a first inlet, the outlet can be a first outlet, and the BOAS can further include a second thermal regulation channel defining a second inlet aft of the sealing surface and a second outlet defined in fluid communication with the forward cavity portion. The first outlet can be separated from the second outlet by a divider disposed within the forward cavity.

In accordance with at least one aspect of this disclosure, a turbomachine can include a BOAS as described above.

In accordance with at least one aspect of this disclosure, a method can include disposing a thermal regulation channel in a BOAS body such that the thermal regulation channel defines an inlet aft of a sealing surface of the BOAS and an outlet defined in fluid communication with a forward cavity portion defined by the BOAS body. Disposing the thermal regulation channel can include at least one of drilling the channel through the BOAS body or forming the BOAS body to include the thermal regulation channel.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 2:
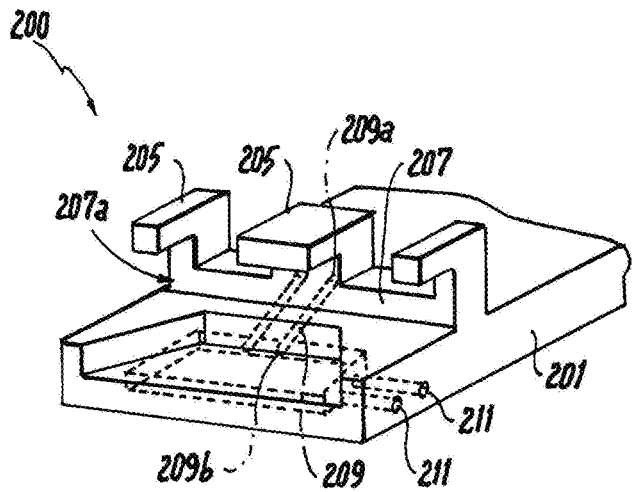
FIG. 2 is a partial perspective schematic view of an embodiment of a blade outer air seal (BOAS) in accordance with this disclosure, showing thermal regulation channels in phantom leading from an aft inlet to a forward outlet in a forward cavity portion.
Figure 3:
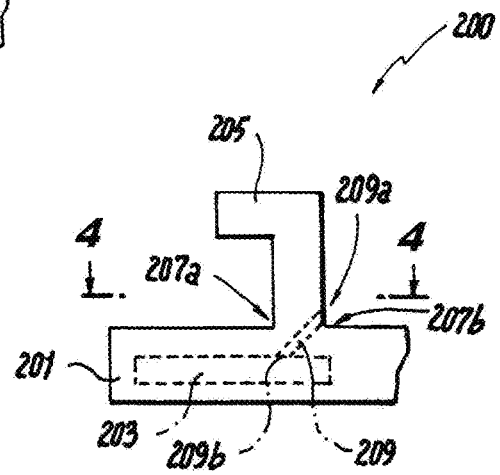
FIG. 3 is a partial cross-sectional view of the BOAS of FIG. 2.
Figure 4:
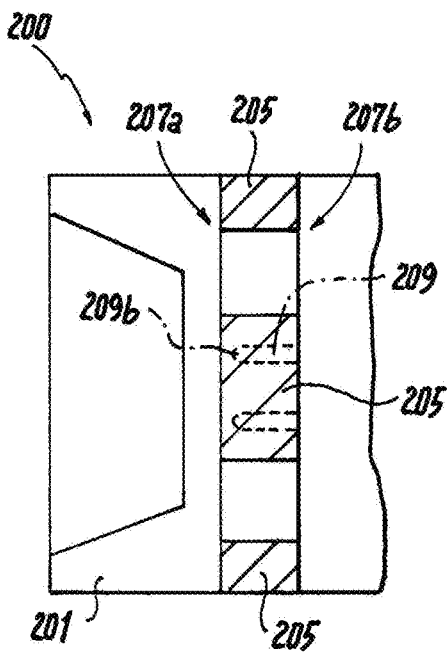
FIG. 4 is a partial cross-sectional plan view of the BOAS of FIG. 2.
Figure 5:
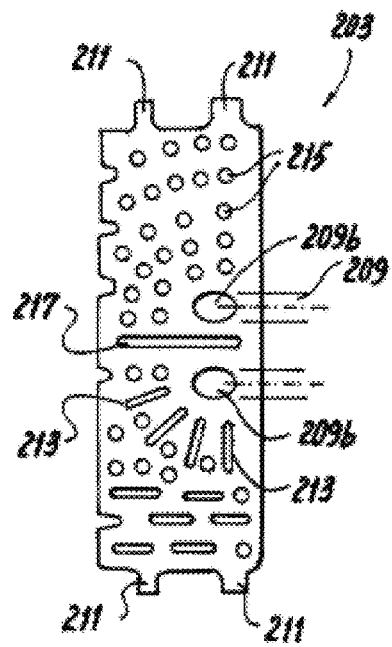
FIG. 5 is a schematic view of an embodiment of a flow area of a forward cavity portion in accordance with this disclosure.

Reference will now be made to the drawings wherein like reference numerals identify similar structural features or aspects of the subject disclosure. For purposes of explanation and illustration, and not limitation, an illustrative view of an embodiment of a blade outer air seal (BOAS) 200 in accordance with the disclosure is shown in FIG. 2 and is designated generally by reference character 200. Other embodiments and/or aspects of this disclosure are shown in FIGS. 3-5. The systems and methods described herein can be used to provide cooling flow to a forward cavity portion of a BOAS from an aft location.

Figure 1:
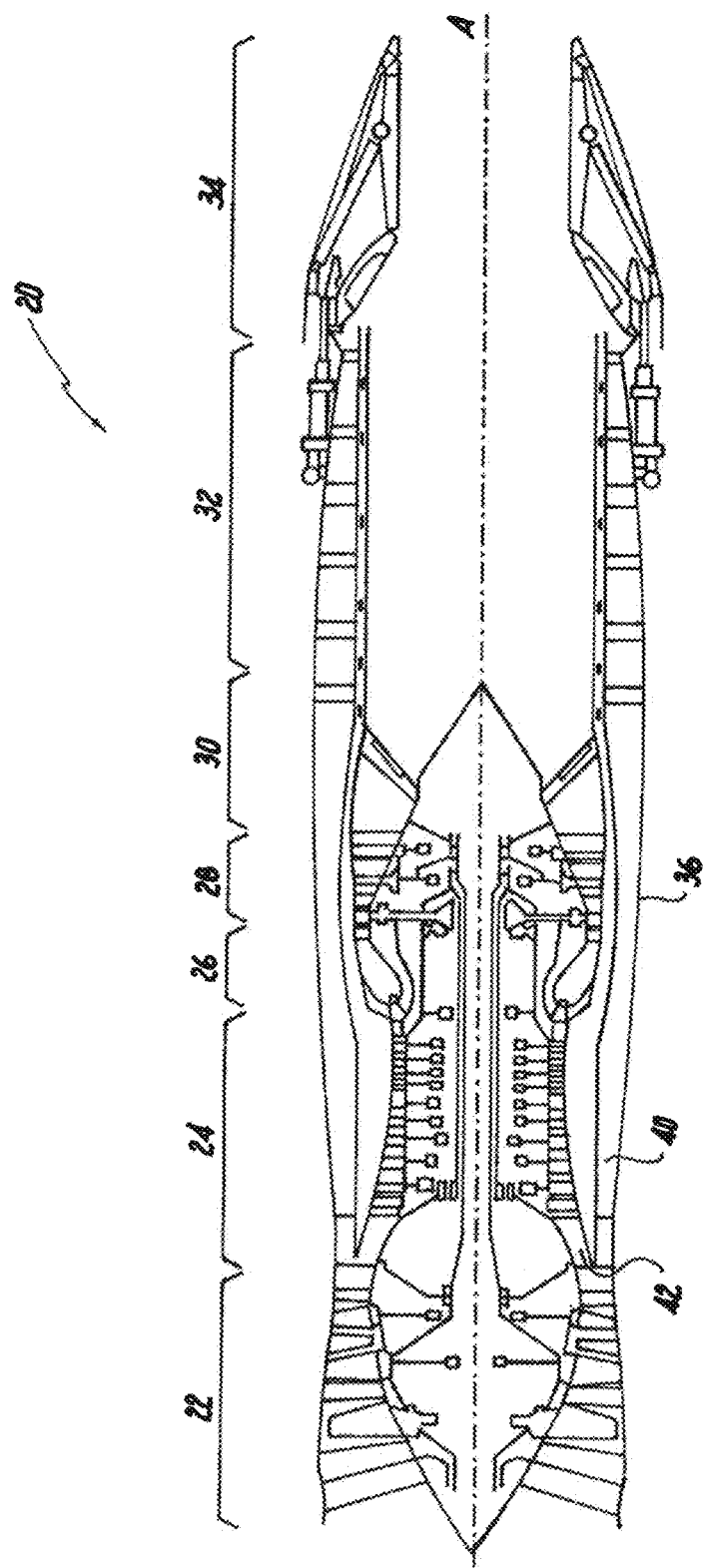
FIG. 1 is a schematic view of a turbomachine in accordance with this disclosure.

FIG. 1 schematically illustrates a gas turbine engine 20. The gas turbine engine 20 is disclosed herein as a two-spool low-bypass augmented turbofan that generally incorporates a fan section 22, a compressor section 24, a combustor section 26, a turbine section 28, an augmenter section 30, an exhaust duct section 32, and a nozzle system 34 along a central longitudinal engine axis A. Although depicted as an augmented low bypass turbofan in the disclosed non-limiting embodiment, it should be understood that the concepts described herein are applicable to other gas turbine engines including non-augmented engines, geared architecture engines, direct drive turbofans, turbojet, turboshaft, multi-stream variable cycle adaptive engines and other engine architectures. Variable cycle gas turbine engines power aircraft over a range of operating conditions and essentially alters a bypass ratio during flight to achieve countervailing objectives such as high specific thrust for high-energy maneuvers yet optimizes fuel efficiency for cruise and loiter operational modes.

An engine case structure 36 defines a generally annular secondary airflow path 40 around a core airflow path 42. It should be appreciated that various components, individually and collectively, may define the engine case structure 36 that essentially defines an exoskeleton to support the rotational hardware.

Air that enters the fan section 22 is divided between a core airflow through the core airflow path 42 and a secondary airflow through a secondary airflow path 40. The core airflow passes through the combustor section 26, the turbine section 28, then the augmentor section 30 where fuel may be selectively injected and burned to generate additional thrust through the nozzle system 34. It should be appreciated that additional airflow streams such as third stream airflow typical of variable cycle engine architectures may additionally be sourced from the fan section 22.

The secondary airflow may be utilized for a multiple of purposes to include, for example, cooling and pressurization. The secondary airflow as defined herein may be any airflow different from the core airflow. The secondary airflow may ultimately be at least partially injected into the core airflow path 42 adjacent to the exhaust duct section 32 and the nozzle system 34.

The exhaust duct section 32 may be circular in cross-section as typical of an axisymmetric augmented low bypass turbofan or may be non-axisymmetric in cross-section to include, but not be limited to, a serpentine shape to block direct view to the turbine section 28. In addition to the various cross-sections and the various longitudinal shapes, the exhaust duct section 32 may terminate in a Convergent/Divergent (C/D) nozzle system, a non-axisymmetric two-dimensional (2D) C/D vectorable nozzle system, a flattened slot nozzle of high aspect ratio or other nozzle arrangement.

Referring to FIGS. 2-4, a blade outer air seal (BOAS) 200 includes a body 201 defining a core having a forward cavity portion 203 and a plurality of forward hooks 205 extending radially from the body 201. The hooks 205 extend to any suitable hook height and are configured to mount to a BOAS mount (not shown).

The BOAS 200 includes a seal surface 207 defined between the forward hooks 205 and can include a forward side 207a, an aft side 207b, and any suitable seal surface height such that the seal surface height is less than the forward hook height. The seal surface 207 can be positioned aft of the forward cavity portion 203. The forward side 207a of the seal surface 207 is configured to be communicated with a brush seal or the like when installed in the turbomachine.

The BOAS 200 includes one or more thermal regulation channels 209 defining an inlet 209a aft of the sealing surface 207 and an outlet 209b defined in fluid communication with the forward cavity portion 203. As shown, the thermal regulation channels 209 can be defined at an angle from the inlet 209a to the outlet 209b in a direction relative to a radial direction of the turbomachine. While the thermal regulation channels 209 are shown as located under a forward hook 205, it is contemplated that the thermal regulation channels 209 can be positioned in any suitable circumferential or lateral location on the BOAS 200 with any suitable angle between each inlet 209a and the outlet 209b.

Referring to FIGS. 2 and 3, the inlet 209a can be defined in the aft side 207b of the seal surface. Any other suitable location for the inlet 209a (e.g., aft of the sealing surface 207) is contemplated herein.

As shown in FIG. 4, the outlet 209b can be defined at least partially forward of the forward side 207a of the seal surface 207. However, any other suitable outlet location (e.g., under the seal surface 207) is contemplated herein.

The BOAS 200 can further include a plurality of side outlets 211 in fluid communication with the forward cavity portion 203 to allow flow to effuse from a side of the BOAS 200 and into a gas path. As shown in FIG. 5, the BOAS 200 can include one or more flow guides 213 and/or posts 215 disposed between the outlet 209b of the thermal regulation channel 209 and the side outlets 211. Such flow features can enhance thermal transfer in the forward cavity 200 and or guide flow (e.g., cooling flow) in a desired manner. The density and/or spacing of the flow features 213, 215 can be set to achieve a desired flow distribution.

As shown, in certain embodiments, an outlet 209b can be separated from other outlets 209b by a divider 217 disposed within the forward cavity 203 between each two outlets 209b. While two outlets 209b are shown disposed symmetrically, it is contemplated that the outlets 209b can be asymmetric relative to each other. While a plurality of thermal regulation channels 209 are shown, each having their own inlets 209a and outlets 209b, any suitable number of thermal regulation channels (e.g., one) can be fluidly communicated with any suitable number of inlets 209a (e.g., two) and/or outlets 209b (e.g., three) and can be arranged in any suitable manner so as to bring aft flow forward into the forward cavity 203.

Referring to FIGS. 1-4, in accordance with at least one aspect of this disclosure, a method can include disposing a thermal regulation channel 209 in a body 201 of a BOAS 200 such that the thermal regulation channel 209 defines an inlet 209a aft of a sealing surface 207 of the BOAS 200 and an outlet 209b defined in fluid communication with a forward cavity 203 defined by the body 201. Disposing the thermal regulation channel 209 can include at least one of drilling the channel through the body 201 or forming the body 201 to include the thermal regulation channel 209 (e.g., via casting, additive manufacturing, or any other suitable means). Any other suitable methods of manufacturing the thermal regulation channel 209 into the body 201 are contemplated herein.

Using embodiments as disclosed herein, a leading edge portion of the BOAS 200 can be thermally regulated (e.g., cooled). After flow passes from the aft inlet 209a, through the channel 209, through the outlet 209b, and through the forward cavity 203, the flow can then be distributed to the intersegment gap through side outlets 211. Since the forward cavity 203 can be fed from an aft location, the seal that contacts the forward side 207a of the sealing surface 207 no longer blocks fluid flow to the forward cavity 203.

The methods and systems of the present disclosure, as described above and shown in the drawings, provide for BOAS with superior properties including thermal regulation using aft inlet locations. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:
1. A blade outer air seal (BOAS), comprising:
a body defining a core, the core including a forward cavity portion;
a plurality of forward hooks extending radially from the body, the hooks extending to a hook height;

a seal surface defined between the forward hooks, the seal surface including a forward side, an aft side, and a seal surface height, wherein the seal surface is aft of the forward cavity portion;

a thermal regulation channel defining an inlet aft of the sealing surface and an outlet defined in fluid communication with the forward cavity portion;

a plurality of side outlets in fluid communication with the forward cavity portion to allow flow to effuse from a side of the BOAS and into a gas path;

one or more flow guides disposed between the outlet of the thermal regulation channel and the side outlets, the one or more flow guides forming a fan-like arrangement to spread out cooling flow evenly within the body; and one or more posts disposed between the outlet of the thermal regulation channel and the side outlets, the one or more posts arranged to spread out cooling flow evenly within the body.

2. The BOAS of claim 1, wherein the thermal regulation channel is defined at an angle from the inlet to the outlet relative to a radial direction.

3. The BOAS of claim 1, wherein the inlet is defined in the aft side of the seal surface.

4. The BOAS of claim 1, wherein the outlet is defined at least partially forward of the forward side of the seal surface.

5. The BOAS of claim 1, wherein the inlet is a first inlet, the outlet is a first outlet, and the BOAS further comprises a second thermal regulation channel defining a second inlet aft of the sealing surface and a second outlet defined in fluid communication with the forward cavity portion.

6. The BOAS of claim 5, wherein the first outlet is separated from the second outlet by a divider disposed within the forward cavity.

7. A turbomachine, comprising:
a blade outer air seal (BOAS), the BOAS including:
a body defining a core, the core including a forward cavity portion;
a plurality of forward hooks extending radially from the body, the hooks extending to a hook height;
a seal surface defined between the forward hooks, the seal surface including a forward side, an aft side, and a seal surface height, wherein the seal surface is aft of the forward cavity portion;
a thermal regulation channel defining an inlet aft of the sealing surface and an outlet defined in fluid communication with the forward cavity portion;
a plurality of side outlets in fluid communication with the forward cavity portion to allow flow to effuse from a side of the BOAS and into a gas path;
one or more flow guides disposed between the outlet of the thermal regulation channel and the side outlets, the one or more flow guides forming a fan-like arrangement to spread out cooling flow evenly within the body; and
one or more posts disposed between the outlet of the thermal regulation channel and the side outlets, the one or more posts arranged to spread out cooling flow evenly within the body.

8. The turbomachine of claim 7, wherein the thermal regulation channel is defined at an angle from the inlet to the outlet relative to a radial direction.

9. The turbomachine of claim 7, wherein the inlet is defined in the aft side of the seal surface.

10. The turbomachine of claim 7, wherein the outlet is defined at least partially forward of the forward side of the seal surface.

11. The turbomachine of claim 7, wherein the inlet is a first inlet, the outlet is a first outlet, and the BOAS further comprises a second thermal regulation channel defining a second inlet aft of the sealing surface and a second outlet defined in fluid communication with the forward cavity portion.

12. The turbomachine of claim 11, wherein the first outlet is separated from the second outlet by a divider disposed within the forward cavity.

13. A method, comprising:
disposing a thermal regulation channel in a blade outer air seal (BOAS) body such that the thermal regulation channel defines an inlet aft of a sealing surface of the BOAS and an outlet defined in fluid communication with a forward cavity portion defined by the BOAS body,
forming a plurality of side outlets in fluid communication with the forward cavity portion to allow flow to effuse from a side of the BOAS and into a gas path;
disposing one or more flow guides between the outlet of the thermal regulation channel and the side outlets, the one or more flow guides forming a fan-like arrangement to spread out cooling flow evenly within the body; and
disposing one or more posts between the outlet of the thermal regulation channel and the side outlets, the one or more posts arranged to spread out cooling flow evenly within the body.

14. The method of claim 13, wherein disposing the thermal regulation channel includes at least one of drilling the channel through the BOAS body or forming the BOAS body to include the thermal regulation channel.

* * * * *